US008191862B2

(12) United States Patent
Arabian

(10) Patent No.: US 8,191,862 B2
(45) Date of Patent: Jun. 5, 2012

(54) PORTABLE SPRING-DAMPER COMPRESSOR

(75) Inventor: Christopher Arabian, Hilliard, OH (US)

(73) Assignee: Honda Motor Co., Ltd., Tokyo (JP)

(*) Notice: Subject to any disclaimer, the term of this patent is extended or adjusted under 35 U.S.C. 154(b) by 817 days.

(21) Appl. No.: 12/255,762

(22) Filed: Oct. 22, 2008

(65) Prior Publication Data

US 2009/0108242 A1    Apr. 30, 2009

Related U.S. Application Data

(60) Provisional application No. 60/982,541, filed on Oct. 25, 2007.

(51) Int. Cl.
| | |
|---|---|
| *B60P 1/48* | (2006.01) |
| *B66F 3/22* | (2006.01) |
| *B66F 3/00* | (2006.01) |
| *B66F 5/02* | (2006.01) |
| *B66F 5/04* | (2006.01) |
| *B23P 19/04* | (2006.01) |

(52) U.S. Cl. ....... 254/10.5; 254/122; 254/123; 254/124; 254/125; 254/126; 254/133 R; 254/134; 254/10 B; 254/2 B; 29/227

(58) Field of Classification Search .......... 254/122–126, 254/133 R, 134, 10 B, 2 B, 10.5; 29/227
See application file for complete search history.

(56) References Cited

U.S. PATENT DOCUMENTS

| | | | |
|---|---|---|---|
| 2,948,057 A | 8/1960 | Dagenais | |
| 3,078,556 A * | 2/1963 | Carroll | 29/226 |
| 3,814,382 A | 6/1974 | Castoe | |
| 3,902,698 A | 9/1975 | Furrer et al. | |
| 4,009,867 A | 3/1977 | Diffenderfer | |
| 4,105,188 A | 8/1978 | Mendoza et al. | |
| 4,136,521 A | 1/1979 | Mendoza et al. | |
| 4,295,634 A | 10/1981 | Spainhour et al. | |
| 4,395,020 A | 7/1983 | Spainhour | |
| 4,785,519 A | 11/1988 | Krueger | |
| 5,507,470 A | 4/1996 | Amstutz | |
| 5,680,686 A * | 10/1997 | Bosche et al. | 29/227 |
| 5,967,493 A | 10/1999 | Amstutz | |
| 6,336,625 B1 | 1/2002 | Liao | |
| RE38,818 E | 10/2005 | Amstutz | |
| 7,096,550 B2 * | 8/2006 | Klann | 29/227 |
| 7,103,951 B2 | 9/2006 | Uzun | |
| 7,386,926 B2 | 6/2008 | Bosche et al. | |

FOREIGN PATENT DOCUMENTS

EP    0771616 B1    3/2002

* cited by examiner

*Primary Examiner* — Monica Carter
*Assistant Examiner* — Nirvana Deonauth
(74) *Attorney, Agent, or Firm* — Mark E. Duell, Esq.; Emerson Thomson Bennett

(57) ABSTRACT

The present invention relates to a spring compression apparatus for compressing a coil spring and a related method of making this apparatus. A top plate is provided that engages and supports a first end of a coil spring. A middle plate engages and supports a second end of the coil spring, so that the coil spring is supported between these two plates. A base plate is disposed on an opposite side of the middle plate from the top plate. A frame is formed that fixedly supports the top plate and the base plate. The frame also slidably supports the middle plate. A jack, which is positioned between the base plate and the middle plate. The jack urges the middle plate toward the top plate, so as to compress the coil spring.

20 Claims, 5 Drawing Sheets

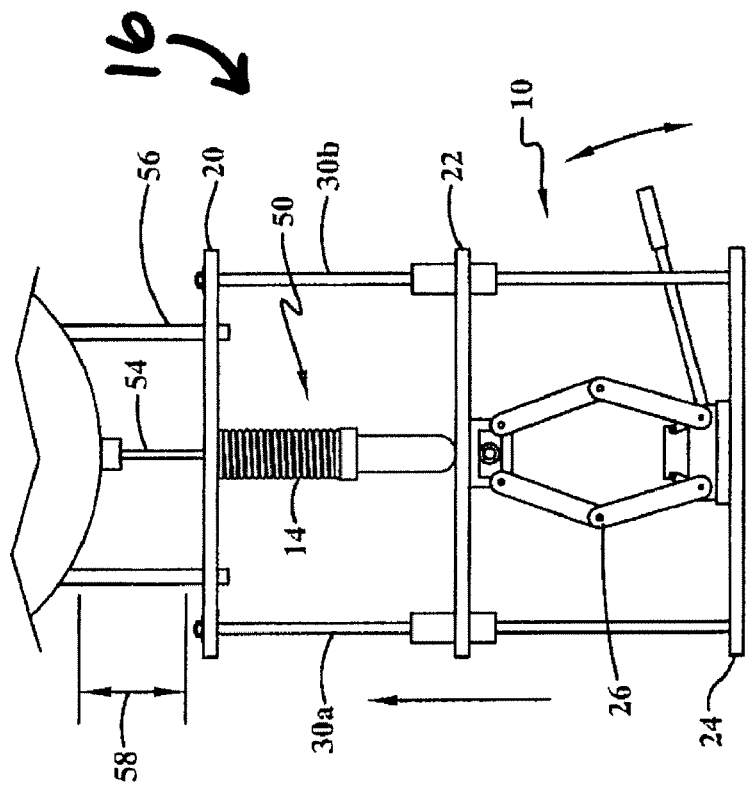
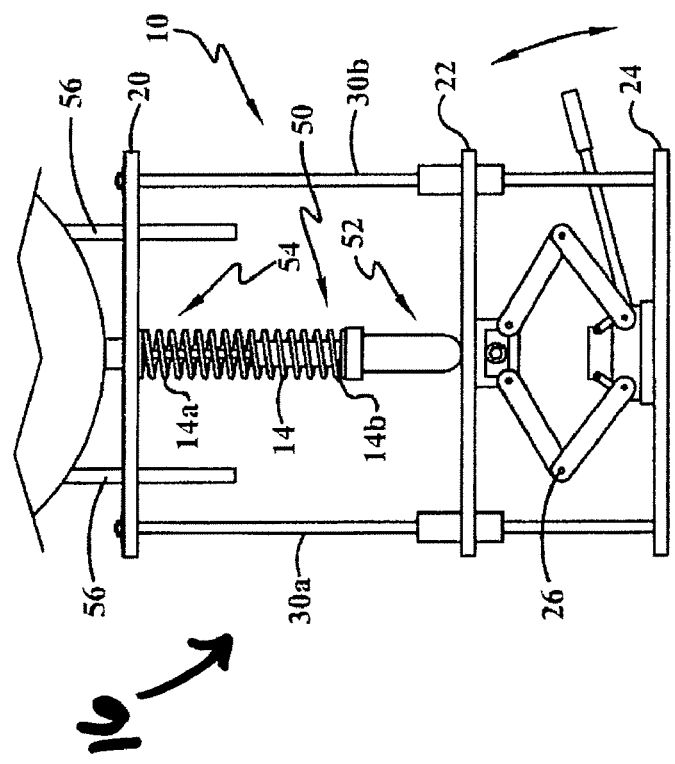
FIG. 2A
FIG. 2B

PORTABLE SPRING-DAMPER COMPRESSOR

I. RELATED APPLICATIONS

The present application claims priority to U.S. Provisional Patent Application No. 60/982,541 filed Oct. 25, 2007, which is hereby incorporated by reference in its entirety.

II. BACKGROUND OF THE INVENTION

A. Field of Invention

This invention generally relates to systems for compressing a vehicle spring and damper during installation and removal. In particular, the invention relates to spring damper compression systems having a portable design.

B. Description of the Related Art

Suspension systems for motor vehicles typically include a coil spring mounted over a dampening shock absorber located at each wheel to dissipate energy and thereby provide a smoother ride while traveling over uneven terrain. When installed, the coil spring extends over the shock absorber, which dampens the energy of the spring when compressed during use. It is well known in the art to employ a spring compressor to compress the spring and thereby remove the load from the holding nut at the top of the shock absorber, so that the shock absorber can be installed or removed.

Common-type spring compressors include a type of fixture that is configured to surround and grip the coil spring during installation. The spring is compressed within the fixture to relieve tension and allow access to the shock absorber. With previous-type systems, it has been found to be difficult to compress the spring for disassembly and reassembly. Some previous-type systems use a claw-type arrangement for gripping the spring. Such systems have difficulties with gripping the spring due to the spring's curvature, and are prone to slip.

In order to overcome these difficulties, methods and apparatuses would be needed that would allow easier compression of a coil spring to relieve tension on a holding nut and thereby allow easier access to a shock absorber.

III. SUMMARY OF THE INVENTION

Some embodiments of the present invention relate to a spring compression apparatus for compressing a coil spring. A top plate is provided that engages and supports a first end of a coil spring. A middle plate engages and supports a second end of the coil spring, so that the coil spring is supported between these two plates. A base plate is disposed on an opposite side of the middle plate from the top plate. A frame is formed that fixedly supports the top plate and the base plate. The frame also slidably supports the middle plate. A jack is provided, which is positioned between the base plate and the middle plate. The jack urges the middle plate toward the top plate, so as to compress the coil spring.

Other embodiments of the invention relate to a spring compression apparatus including three plates supported in a frame. An anterior plate is provided for engaging and supporting a first end of a coil spring. An interior plate engages and supports a second end of the coil spring. The interior plate is substantially parallel to and concentric with the anterior plate along a central axis. A posterior plate is disposed on an opposite side of the interior plate from the anterior plate. The posterior plate is substantially parallel to and concentric with the anterior and interior plates along the central axis. A frame is provided comprising a plurality of mounting columns, each of which are parallel to the central axis and perpendicular to the anterior, interior, and posterior plates. The mounting columns are circumferentially arranged to fixedly engage interior portions of the anterior and posterior plates and to slidably engage interior portions of the interior plate. A jack is positioned between the interior and posterior plates, for moving the interior plate toward the anterior plate along the central axis. In this way, the spring compression apparatus compresses the coil spring.

Still other embodiments relate to methods of constructing a spring compression apparatus. A plurality of mounting columns are provided. The mounting columns are fixedly engaged to interior portions of a base plate in a circumferential arrangement, perpendicular to the base plate and parallel to a central axis. The mounting columns are slidably engaged to interior portions of a middle plate in a circumferential arrangement, perpendicular to the middle plate and parallel to the central axis, so that the middle plate is substantially parallel to the base plate and concentric with the base plate along the central axis. The mounting columns are also fixedly engaged to interior portions of a top plate in a circumferential arrangement, perpendicular to the middle plate and parallel to the central axis, so that the top plate is disposed on an opposite side of the middle plate from the base plate. In this arrangement, the top plate is substantially parallel to the base plate and the middle plate, and concentric with the base plate and middle plate along the central axis. A jack is positioned between the base plate and the middle plate, for moving the middle plate toward the top plate along the central axis, so as to compress a coil spring.

One advantage of this invention is that it easily compresses a coil spring and thereby removes the load from a holding nut, so that a shock absorber can be installed or removed.

Another advantage of this invention is that it is does not suffer from the drawbacks of claw-type arrangements that have difficulty gripping the spring due to the curvature of the spring.

Yet another advantage of this invention is that it grips the spring without being prone to slip.

Other benefits and advantages will become apparent to those skilled in the art to which it pertains upon reading and understanding of the following detailed specification.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIGS. 2A and 2B are side views showing the assembled apparatus and two respective states of operation of the spring compression system in accordance with an embodiment of the present invention.

V. DETAILED DESCRIPTION OF THE INVENTION

The present invention generally relates to a spring compression system and methods for making the same, so as to enable a spring damper system to be compressed and thereby facilitate installation and removal of the same.

Figure 1:
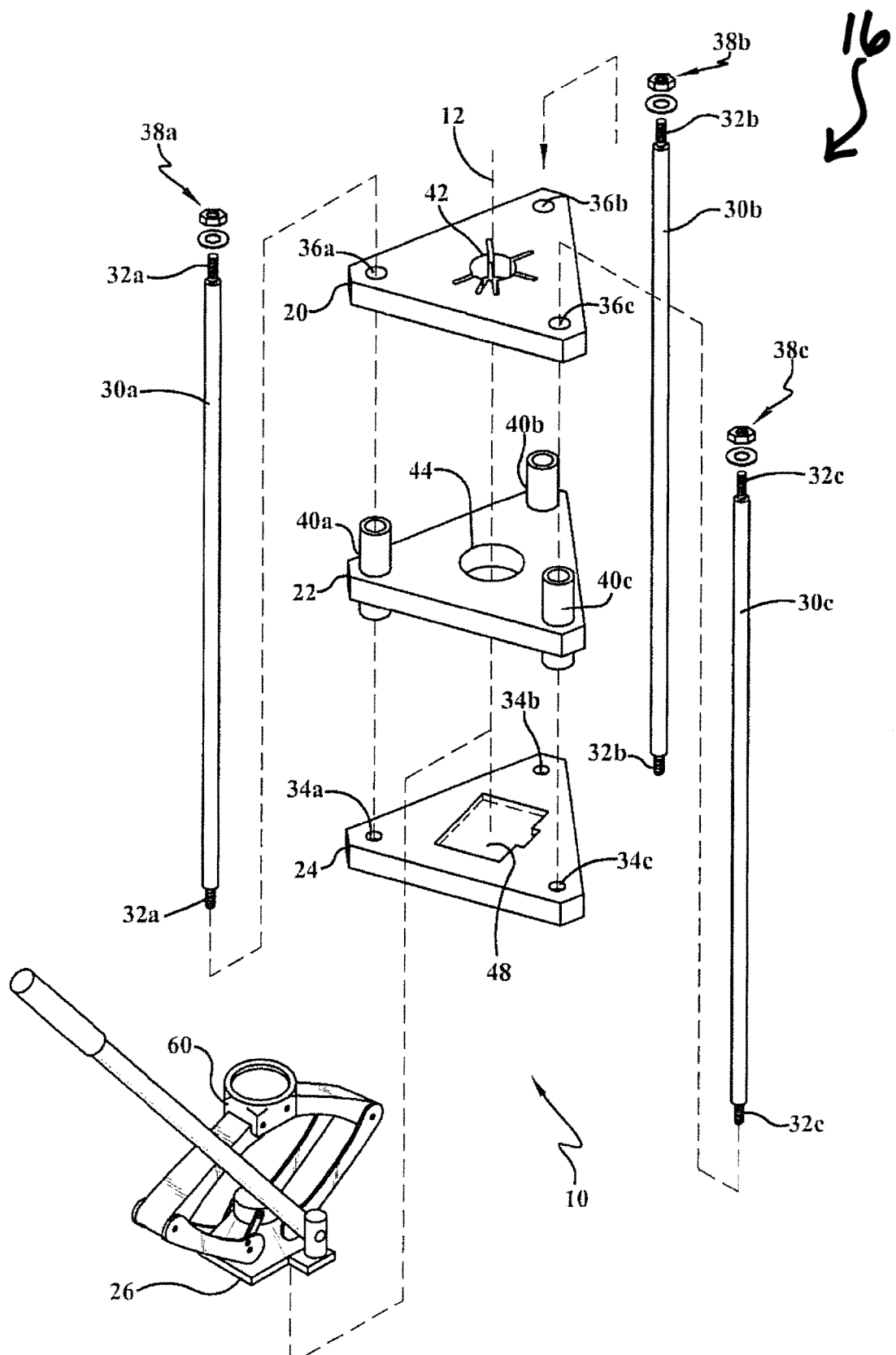
FIG. 1 is an exploded view depicting the components of the spring compression system in accordance with an embodiment of the present invention.

We refer now to the drawings wherein the showings are for purposes of illustrating embodiments of the invention only and not for purposes of limiting the same, and wherein like reference numerals are understood to refer to like components. FIGS. 1, 2A, and 2B generally illustrate a spring compression apparatus 10 and the constituent components thereof, aligned with respect to a central axis 12, for compressing a coil spring 14, preferably a coil spring used in conjunction with a shock absorber in a vehicle suspension system.

A top plate or anterior plate 20 is provided that engages and supports a first end 14a of the coil spring 14. As shown, the top plate 20 is generally flat and has two substantially parallel opposing surfaces. A middle plate or interior plate 22 is provided that generally engages and supports a second end 14b of the coil spring 14. The middle plate 22 is also generally flat with two parallel opposing surfaces, and these surfaces are substantially parallel to and concentric with the top plate 20 along the central axis 12.

A base plate or posterior plate 24 is disposed on an opposite side of the middle plate 22 from the top plate 20. The base plate 24 is also generally flat with two parallel opposing surfaces. These surfaces are also substantially parallel to and concentric with the top plate 20 and middle plate 22 along the central axis 12.

A frame 16 is provided that fixedly supports the top plate 20 and the base plate 24 so that these components form a stable assembly. The frame 16 slidably supports the middle plate 22. As illustrated, the frame 16 includes a plurality (preferably three) mounting columns 30a, 30b, 30c, each aligned parallel to the central axis 12. The mounting columns 30a, 30b, 30c are aligned perpendicular to the top plate 20, the middle plate 22, and the base plate 24. The mounting columns 30a, 30b, 30c are circumferentially arranged to fixedly engage interior portions of the top plate 20 and the base plate 24, holding them in place against movement. The mounting columns 30a, 30b, 30c are circumferentially arranged to also slidably engage interior portions of the middle plate 22, allowing free movement of the middle plate 22 back and forth along the direction of the central axis 12.

A jack 26 is also provided, positioned between the base plate 24 and the middle plate 22. The jack is used for urging or moving the middle plate 22 toward the top plate 20 along the central axis 12, so as to compress the coil spring 14.

As shown in FIG. 1, the frame 16 formed by the three mounting columns 30a, 30b, 30c are configured in a triangular arrangement extending perpendicularly from the base plate 24 to the top plate 20. Though three mounting columns are shown in the figure, it is to be appreciated that any suitable number of mounting columns 30a . . . 30n could be employed without departing from the invention. Preferably, the three mounting columns 30a, 30b, 30c are configured in an equilateral triangular arrangement. If a greater number of mounting columns are employed, they would preferably be arranged in a regular polyhedral shape corresponding to the number of mounting columns. However, as above, the invention is not to be construed as limited in this manner.

As also shown in FIG. 1, the top plate 20, the middle plate 22, and the base plate 24 are each generally triangular in shape. Preferably, the plates 20, 22, 24 have a generally equilaterally triangular shape. However, if a greater number of mounting columns are employed, these would preferably be in the corresponding shape of a regular polyhedron. The plates 20, 22, 24 are configured to perpendicularly receive a respective mounting column 30a, 30b, 30c in or at least substantially proximate to each of the respective triangular corners.

The mounting columns 30a, 30b, 30c engage interior portions of the top and middle plates 20, 22. These interior portions are preferably spaced from peripheries of each of these plates 20, 22, respectively. These interior portions are perpendicularly secured to respective ends of the mounting columns 30a, 30b, 30c. As especially shown in FIGS. 1, 2A, and 2B, the mounting columns 30a, 30b, 30c have threaded ends 32a, 32b, 32c. Ones of these respective threaded ends 32a, 32b, 32c are received in respective mated threaded holes 34a, 34b, 34c located at the interior portions of the base plate 24.

The respective others of these respective threaded ends 32a, 32b, 32c are received in respective mated non-threaded holes 36a, 36b, 36c located at the interior portions of the top plate 20. The mated non-threaded holes 36a, 36b, 36c have an interior diameter suitable to accommodate the outer diameter of the threaded ends 32a, 32b, 32c. The threaded ends 32a, 32b, 32c are secured in the top plate 20 by respective pairs of nuts and washers 38a, 38b, 38c, which are fastened and secured thereupon.

In order to effect the slidable engagement of the middle plate 22 with the mounting columns 30a, 30b, 30c, a plurality of sleeves 40a, 40b, 40c are provided. These sleeves 40a, 40b, 40c are located at the interior portions of the middle plate 22, substantially at the triangular corners of the middle plate 22. The sleeves 40a, 40b, 40c extend through each surface of the middle plate 22, substantially parallel to the center axis 12. Each of the sleeves 40a, 40b, 40c has an inner diameter that slidably engages an outer diameter of a respective mounting column 30a, 30b, 30c. In this way, smooth motion of the middle plate 22 is effected while maintaining the surfaces of the middle plate 22 parallel to the opposing surfaces of the top and base plates 20, 24.

Figure 3:
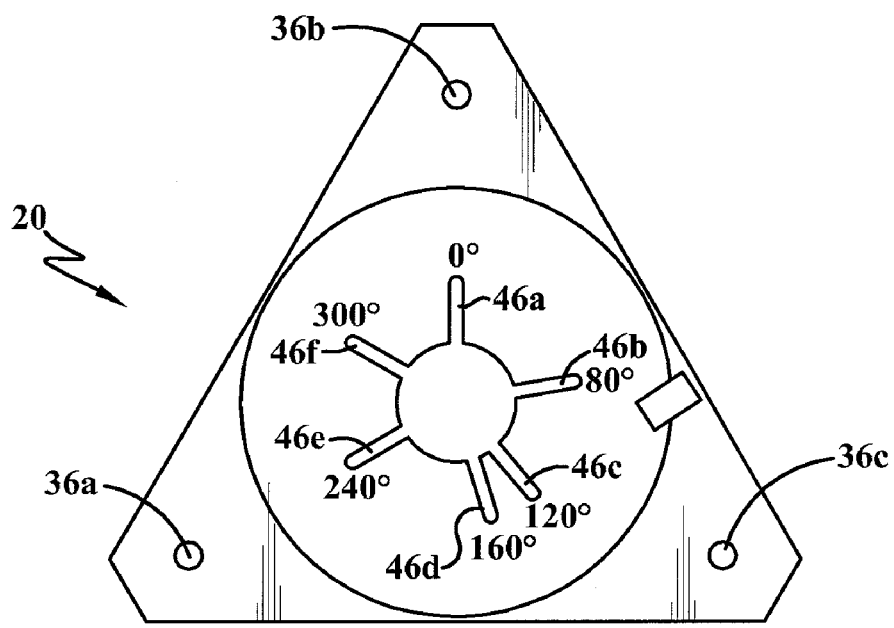
FIG. 3 is a plan view of the top or anterior plate for a spring compression system and showing a pattern of the slot escapes for engaging body studs in accordance with an embodiment of the present invention.

As shown particularly in FIG. 1, the top plate 20 and the middle plate 22 each respectively have a central aperture 42, 44, located along the central axis 12, for accommodating different shock mounting jigs. As particularly shown in FIG. 3, the top plate 20 also includes a plurality of slotted escapes 46a, 46b, 46c, 46d, 46e, 46f, extending radially outward from the top plate central aperture 42, for engaging body studs supporting a shock absorber, so as to accommodate a variety of different body stud configurations.

As shown, the slotted escapes 46a, 46b, 46c, 46d, 46e, 46f extend from the central aperture 42 at angular positions defined by a coordinate system with the center axis 12 at the origin. A first slot 46a extends at an angle of 0 degrees from a "y" coordinate axis at the "12 o'clock" angular position. A second slot 46b extends at an angle of 80 degrees. A third slot 46c extends at an angle of 120 degrees. A fourth slot 46d extends at an angle of 160 degrees. A fifth slot 46e extends at an angle of 240 degrees. A sixth slot 46f extends at an angle of 300 degrees.

A preferred embodiment of the operation of the present spring compression apparatus 10 is particularly shown in FIGS. 2A and 2B, for removing a spring damper or shock absorber 50 from a vehicle suspension system. A bottom end 52 of the shock absorber 50 is removed, allowing the spring compression apparatus 10 to be inserted around the shock absorber 50. The bottom end 52 is inserted through the top plate central aperture 42, and into engagement with the middle plate central aperture 44, so that the top end 54 of the shock absorber 50 extends through the top plate central aperture 42. The slotted escapes 46a, 46b, 46c, 46d, 46e, 46f engage the body studs 56 on the vehicle body that support the shock absorber 50.

As shown in FIG. 2A, the first end 14a of the coil spring 14 is at the top end 54 and engages the top plate 20 while the second end 14b of the coil spring 14 is held by the bottom end 52, and thereby engaged and supported by the middle plate 22. A handle on the jack 26 is pumped so as to lift the jack 26 and move the middle plate 22 toward the top plate 20. As shown in FIG. 2B, the movement of the middle plate 22 results in compression of the coil spring 14, which produces a displacement 58 of the top end 54 of the shock absorber 50. In this way, ample room is available so that a holding nut of the shock absorber 50 can be removed.

Figure 4:
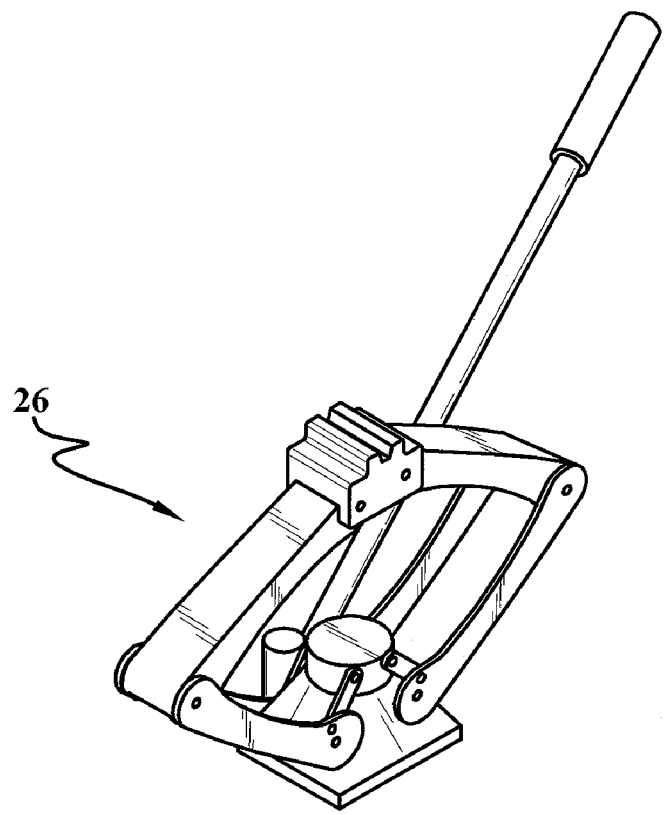
FIG. 4 is a perspective view illustrating a jack for a spring compression system in accordance with an embodiment of the present invention.

FIG. 4 depicts a preferred jack 26 to be used with the present invention. In the preferred embodiment, it is a conventional hydraulic scissor jack having a handle that is pumped in order to extend a scissor arrangement, and thereby produce lift. In the preferred embodiment, the jack 26 is a hydraulic scissor jack of the type sold under the part number 28985T12 by the McMaster-Carr Supply Company of Chicago, Ill. Of course, it is to be appreciated that any suitable jack, hydraulic or otherwise, could be incorporated without departing from the present invention. As shown again in FIG. 1, the base plate 24 includes a recess 48 sized and shaped to receive the jack 26, which can be retained in place by machine screws or any other type of suitable fastening means.

Figure 5:
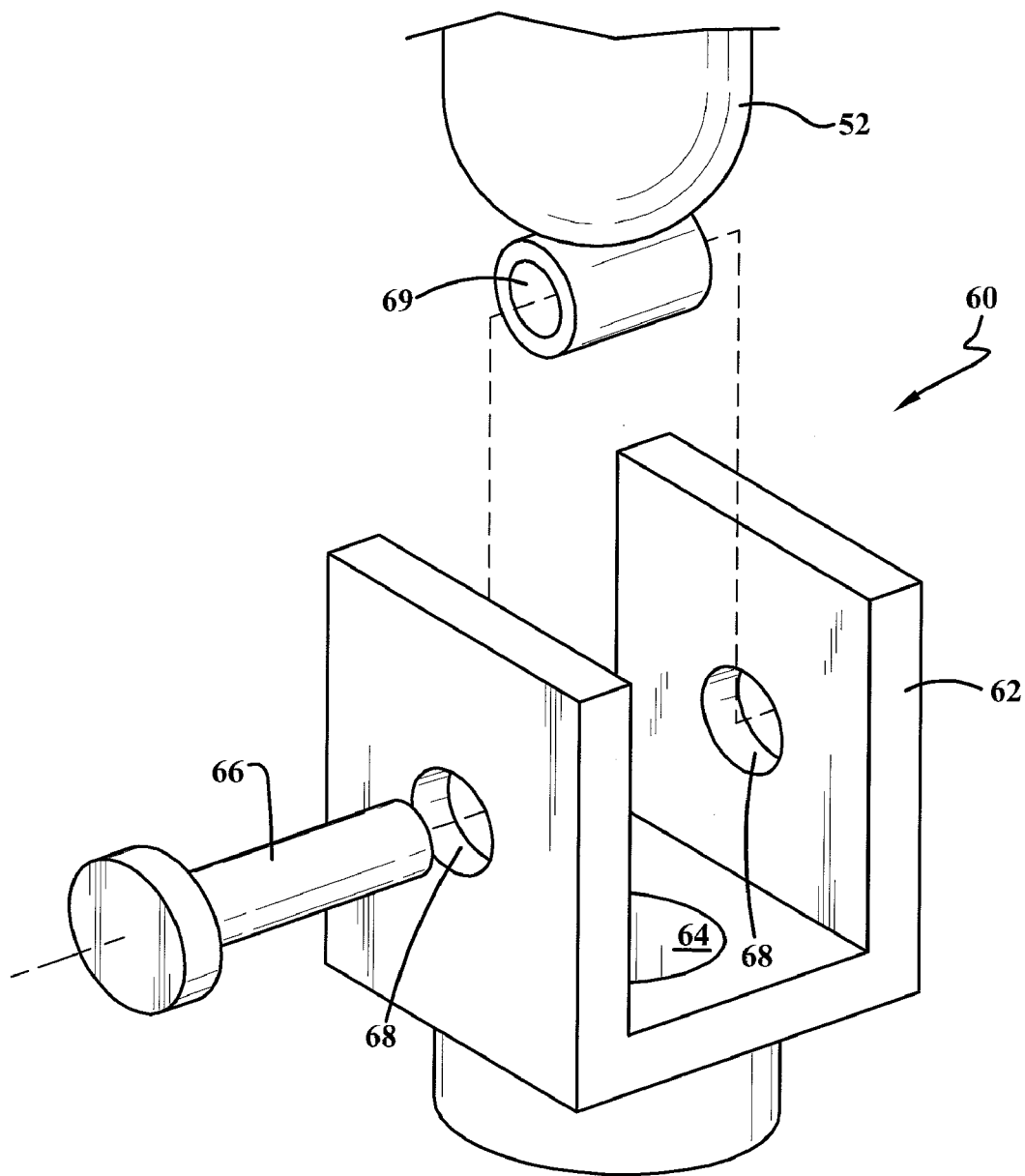
FIG. 5 is a perspective view showing a damper fixture for a spring compression system in accordance with an embodiment of the present invention.

FIG. 5 illustrates a rear damper fixture 60 used in conjunction with the jack 26. The rear damper fixture 60 has a generally U-shaped channel 62 that is received on the top of the jack 26. The U-shaped channel 62 can be secured to the jack 26 through screws, a weld, or any other suitable manner that will hold it in place. The rear damper fixture 60 includes a circular aperture 64 for receiving a bottom end 52 of the spring damper or shock absorber 50 through the middle plate central aperture 44. The rear damper fixture 60 also includes a pair of side apertures 68 for receiving a pin or bolt 66. The bolt is also received by aperture 69 disposed at the bottom end 52 of the spring damper or shock absorber 50. Accordingly, the bolt 66 is adapted to affix the spring damper or shock absorber 50 to the rear damper fixture 60.

Figure 6:
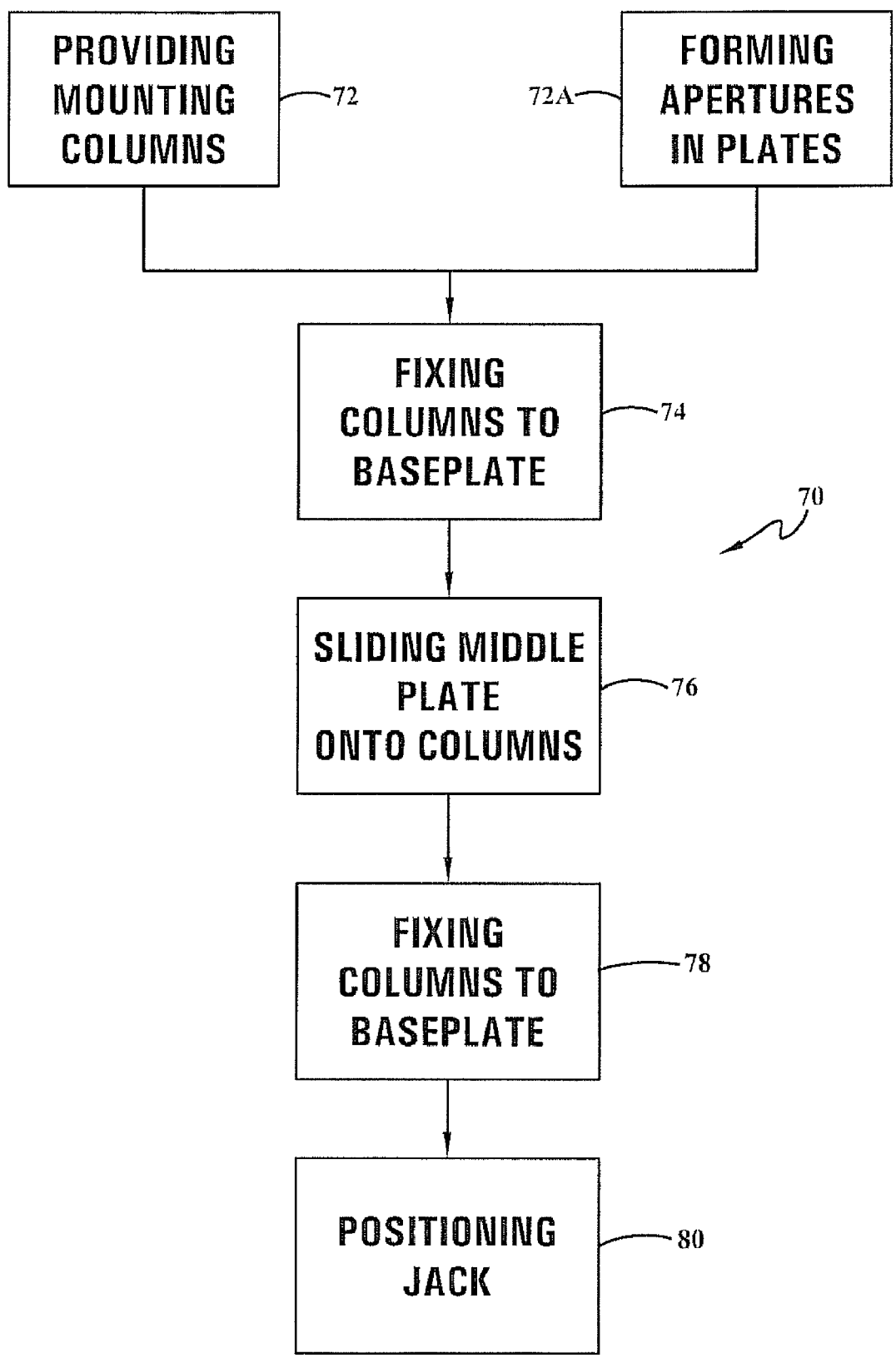
FIG. 6 is a flow chart depicting a method of constructing a spring compression system in accordance with an embodiment of the present invention.

FIG. 6 depicts a method 70 of constructing a spring compression apparatus in accordance with the invention. A step 72 is performed of providing a plurality of mounting columns. A step 74 is performed of fixedly engaging the mounting columns to interior portions of a base plate in a circumferential arrangement, perpendicular to the base plate and parallel to the central axis. A step 76 is performed of slidably engaging the mounting columns to interior portions of a middle plate in a circumferential arrangement, perpendicular to the middle plate and parallel to the central axis. In this way, the middle plate is substantially parallel to the base plate and concentric with the base plate along the central axis.

Another step 78 is performed of fixedly engaging the mounting columns to interior portions of a top plate in a circumferential arrangement, perpendicular to the middle plate and parallel to the central axis. In this manner, the top plate is disposed on an opposite side of the middle plate from the base plate. The top plate is thus substantially parallel to the base plate and the middle plate, and concentric with the base plate and middle plate along the central axis. An additional step 80 is performed of positioning a jack between the base plate and the middle plate, for moving the middle plate toward the top plate along the central axis, so as to compress a coil spring.

The steps 74, 78 of fixedly engaging the mounting columns preferably include fixing three mounting columns in an equilateral triangular arrangement extending perpendicularly from the base plate to the top plate. However, if a greater number of mounting columns are employed, they would preferably be arranged in a regular polyhedral shape corresponding to the number of mounting columns. The base plate, middle plate, and top plate would preferably be in the shape of a regular polyhedron so as to accommodate the arrangement of the columns. It should be appreciated that the invention as described hereinabove is not to be construed as limited in this manner.

In the preferred embodiment, the step 76 of slidably engaging the mounting columns includes providing the middle plate with a plurality of sleeves so that an inner diameter of each sleeve slidably engages an outer diameter of a respective mounting column. Also, in the preferred embodiment, a preliminary step is performed of forming an aperture along the central axis within each of the top plate and the middle plate, to enable the spring compression apparatus to accommodate different shock mounting jigs.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

1. A spring compression apparatus comprising:
  a top plate that engages and supports an upper end of a shock absorber coil spring;
  a middle plate that engages and supports a lower end of the shock absorber coil spring;
  a base plate disposed on an opposite side of the middle plate from the top plate;
  a frame to which the top plate and the base plate are fixedly attached and that slidably supports the middle plate; and
  a jack, substantially all of which is positioned between the base plate and the middle plate, for urging the middle plate toward the top plate, so as to compress the shock absorber coil spring.

2. The spring compression apparatus of claim 1, wherein the frame comprises three mounting columns in a triangular arrangement extending perpendicularly from the base plate to the top plate.

3. The spring compression apparatus of claim 2, wherein the top plate, the middle plate, and the base plate are generally triangular in shape and perpendicularly receive a mounting column in each of the respective triangular corners.

4. The spring compression apparatus of claim 3, wherein the top plate and the base plate are perpendicularly secured to respective ends of the mounting columns.

5. The spring compression apparatus of claim 3, wherein the triangular corners of the middle plate each comprise a sleeve for slidably engaging a respective mounting column.

6. The spring compression apparatus of claim 1, wherein the top plate and the middle plate each have a central aperture for accommodating different shock mounting jigs.

7. The spring compression apparatus of claim 6, wherein the top plate comprises a plurality of slotted escapes, extending from the top plate central aperture, for engaging body studs supporting a shock absorber.

8. The spring compression apparatus of claim 7, wherein the slotted escapes are formed along the central aperture at angular positions of 0 degrees, 80 degrees, 120 degrees, 160 degrees, 240 degrees, and 300 degrees, to accommodate a variety of different body stud configurations.

9. The spring compression apparatus of claim 1, wherein the middle plate contacts and supports a bottom surface of the shock absorber.

10. The spring compression apparatus of claim 9, wherein the top plate has:
   an aperture that receives a top end of the shock absorber; and,
   at least two slotted escapes that extend from the aperture and that receive body studs from an associated vehicle body to which the shock absorber is attached.

11. The spring compression apparatus of claim 9, wherein:
   a bottom surface of the shock absorber extends through an aperture formed in the middle plate;
   the jack comprises a damper fixture comprising a substantially U-shaped channel having at least one aperture;
   the channel receives the bottom of the shock absorber; and,
   a pin is received through an aperture at the bottom end of the shock absorber and through the aperture in the channel to affix the shock absorber o the damper fixture.

12. A method of constructing a spring compression apparatus comprising the steps of:
   (A) providing a plurality of mounting columns;
   (B) fixedly attaching the mounting columns to interior portions of a base plate in a circumferential arrangement, perpendicular to the base plate and parallel to a central axis;
   (C) slidably engaging the mounting columns to interior portions of a middle plate in a circumferential arrangement, perpendicular to the middle plate and parallel to the central axis, so that the middle plate is substantially parallel to the base plate and concentric with the base plate along the central axis;
   (D) fixedly attaching the mounting columns to interior portions of a top plate in a circumferential arrangement, perpendicular to the middle plate and parallel to the central axis, so that the top plate is disposed on an opposite side of the middle plate from the base plate, the top plate being substantially parallel to the base plate and the middle plate, and concentric with the base plate and middle plate along the central axis;
   (E) positioning substantially all of a jack between the base plate and the middle plate;
   (F) positioning a shock absorber between the top plate and middle plate such that the top plate engages and supports an upper end of the shock absorber coil spring and the middle plate engages and supports a lower end of the shock absorber coil spring; and,
   (G) operating the jack to move the middle plate toward the top plate along the central axis, so as to compress a shock absorber coil spring.

13. The method of claim 12, wherein step (F) comprises the step of: contacting and supporting a bottom surface of the shock absorber to the middle plate.

14. The method of claim 13, wherein:
   step (D) comprises the step of: proving the top plate with an aperture and at least two slotted escapes that extend from the aperture; and,
   step (G) comprises the steps of: extending a top end of the shock absorber up through the aperture in the top plate; and, extending a pair of vehicle body studs down through the slotted escapes.

15. The method of claim 13, wherein:
   step (E) comprises the step of: providing the top of the jack with a damper fixture comprising a substantially U-shaped channel having at least one aperture; and,
   step (F) comprises the steps of: extending the bottom surface of the shock absorber through an aperture formed in the middle plate; extending the bottom surface of the shock absorber into the channel; and, inserting a pin through an aperture at the bottom end of the shock absorber and through the aperture in the channel to affix the shock absorber to the damper fixture.

16. The method of claim 12, wherein:
   step (E) comprises the step of: positioning substantially all of a hydraulic jack between the base plate and the middle plate; and,
   step (G) comprises the step of: pumping a handle on the hydraulic jack to move the middle plate toward the top plate.

17. A spring compression apparatus comprising:
   a frame comprising at least three mounting columns;
   a top plate that is fixedly attached to an upper end of the frame and that engages and supports an upper end of a shock absorber coil spring;
   a base plate that is fixedly attached to a lower end of the frame;
   a middle plate that is slidably attached to the at least three mounting columns and that is positioned between the top plate and base plate during operation;
   a hydraulic jack, substantially all of which is positioned between the base plate and the middle plate, for urging the middle plate toward the top plate, so as to compress the shock absorber coil spring.

18. The spring compression apparatus of claim 17, wherein the top plate has:
   an aperture that receives a top end of the shock absorber; and,
   at least two slotted escapes that extend from the aperture and that receive body studs from an associated vehicle body to which the shock absorber is attached.

19. The spring compression apparatus of claim 18, wherein:
   a bottom surface of the shock absorber extends through an aperture formed in the middle plate;
   the jack comprises a damper fixture comprising a substantially U-shaped channel having at least one aperture;
   the channel receives the bottom of the shock absorber; and,
   a pin is received through an aperture at the bottom end of the shock absorber and through the aperture in the channel to affix the shock absorber to the damper fixture.

20. The spring compression apparatus of claim 19, wherein a plurality of slotted escapes are formed at angular positions along the central axis of 0 degrees, 80 degrees, 120 degrees, 160 degrees, 240 degrees, and 300 degrees, to accommodate a variety of different body stud configurations.

* * * * *